C. J. COLEMAN.
MOVING PICTURE APPARATUS.
APPLICATION FILED MAR. 23, 1912.
1,271,667.
Patented July 9, 1918.
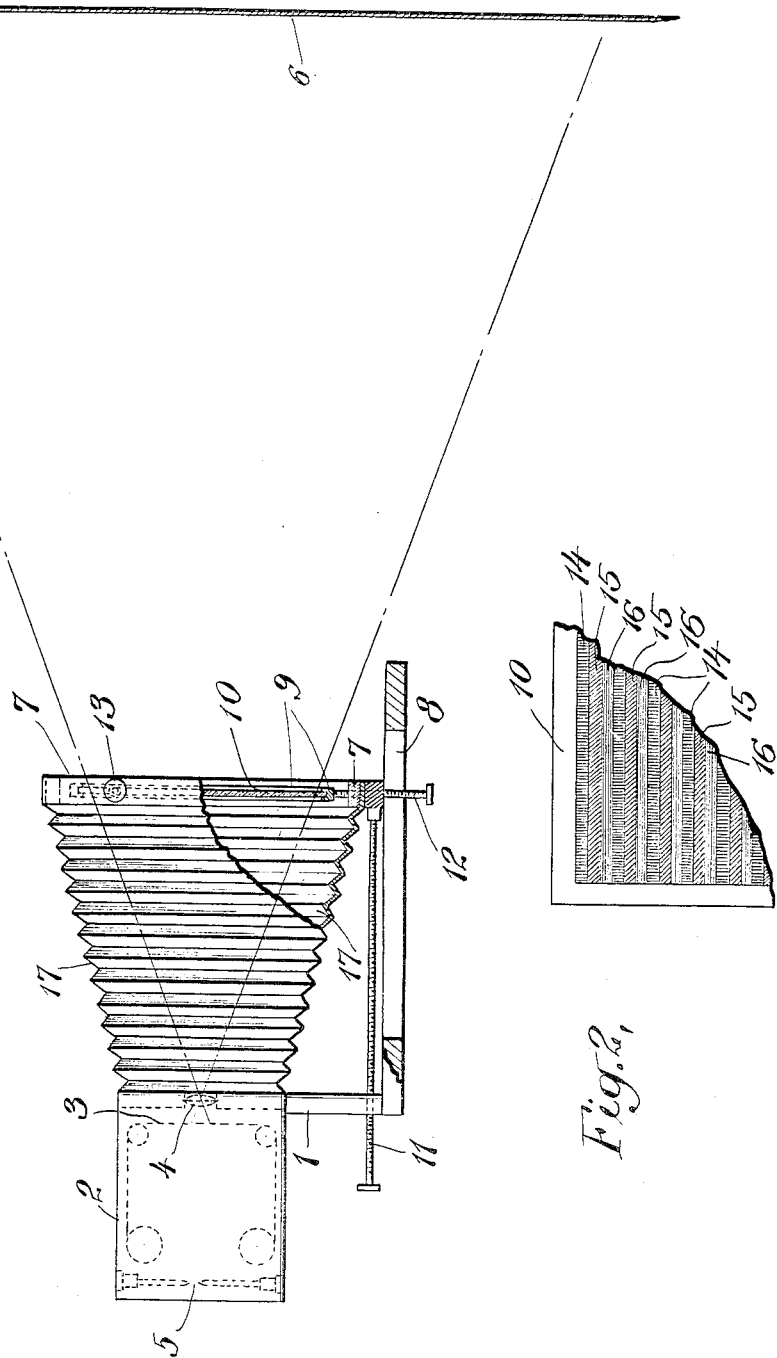
WITNESSES:
George Schlatt.
J. O. Templer
INVENTOR
Clyde J. Coleman
BY
Kenyon & Kenyon
ATTORNEYS

UNITED STATES PATENT OFFICE.

CLYDE J. COLEMAN, OF NEW YORK, N. Y.

MOVING-PICTURE APPARATUS.

1,271,667.  Specification of Letters Patent.  Patented July 9, 1918.

Application filed March 23, 1912. Serial No. 685,688.

*To all whom it may concern:*

Be it known that I, CLYDE J. COLEMAN, a citizen of the United States, and a resident of the city of New York, county and State of New York, have invented certain new and useful Improvements in Moving-Picture Apparatus, of which the following is a specification.

My invention relates to moving picture apparatus and more especially to such apparatus designed for producing colored moving pictures.

One object of my invention is to provide an improved arrangement whereby the moving picture cameras and projecting machines now or hereafter common, may be readily adapted to produce colored moving pictures, and in a simple and efficient manner, and in a manner such that the brilliancy of the picture is not deadened or the colors made faint because of the choking effect of the special color producing apparatus upon the light rays. Further objects, features and advantages will more clearly appear from the detailed description given below taken in connection with the accompanying drawing which forms a part of this specification.

In the drawing, Figure 1 is a side view largely diagrammatical and partly in section of an apparatus illustrating one embodiment of my invention.

Fig. 2 is an enlarged side view of a section of the color screen shown in Fig. 1.

Referring to the figures, 1 represents suitable framework supporting a camera or projecting apparatus 2, containing suitable apparatus for continuously or intermittently moving the film 3 past the lens 4. When the apparatus is being used as a projecting machine any suitable source of light such as an arc light 5 may be placed back of the film 3. Any well known or suitable shutter may be placed between the film and lens, or in front of the lens, and operated in any well known or suitable manner. 6 represents the object which when the apparatus 2 is a camera, represents the things, etc., being photographed, and when the apparatus 2 is a projecting machine is a suitable curtain upon which the colored moving pictures are projected. In either case I term it the object.

7 represents a frame slidably mounted on the base 8 to move horizontally back and forth toward and from the lens 4 and film 3. 9 represents a second frame slidably mounted to move vertically in the frame 7 and 10 represents a color screen slidably mounted to move laterally and horizontally back and forth in the frame 9. An adjusting screw 11 is provided for moving the frame 7 together with the frame 9 and screen 10, toward and from the lens 4. An adjusting screw 12 is provided for moving the frame 9 together with the screen 10 up and down in the frame 7, and an adjusting screw 13 is provided for moving the screen 10 back and forth in the frame 9.

The color screen 10 in the present instance is of a form well known as the "line screen", and as illustrated in Fig. 2, consists of a glass plate provided with fine transparent rulings of the primary colors, red, green and blue. That is, at 14 it is provided with a coating transmitting red light rays, at 15 it is provided with a coating transmitting green light rays, and at 16, with a coating transmitting blue light rays. A suitable hood 17 connects the camera or projecting machine 2 with the frame 7 in order to keep out harmful light.

In operation as a camera apparatus, the rays passing through the parts 14 produce images on the film responsive to the red rays from the object 6, the rays passing through parts 15 produce similar images or impressions responsive to the green rays from the object, and the rays passing through the parts 16 produce similar impressions responsive to the blue rays from the object. If now the film be developed, a positive made, and projected through the same or a similar screen, composite colored pictures will be produced on the screen 6. By suitable operation of the projecting apparatus these may appear to be in motion, as will be readily understood by those skilled in the art. The lines 14, 15, and 16 on the screen are so small that the separate bands or strips of red, green and blue are not dintinguishable from one another on the screen to the naked eye, but they appear blended together, to form a composite colored picture.

It will be clear that if the screen 10 be placed between the lens 4 and the film, or at a distance in front of the lens, not greater than the distance between the film and the lens, the screen 10 will not only have to be so small that it will be practically impossible to make the colored rulings 14, 15 and 16 thereon fine enough, but also the rulings will be so greatly magnified on the curtain 6 that they would appear distinct from one another, and would not appear blended, to the eye. I therefore place the screen 10 at a distance in front of the lens equal to about one twentieth or more of the distance between the lens and object 6. This allows a great many more rulings to be gotten on the screen for a picture of a given size on the curtain, whereby a more perfect blending of the colors is obtained. Moreover, with the screen between the object and lens, or only at a short distance in front of the lens, all of the light rays have to pass through a very small area on the screen. It is found that thereby the light rays are greatly choked or decreased by the large resistance in passing through the screen so that the resulting moving pictures suffer much in brilliancy and effectiveness. By placing the screen well in front of the lens, however, the area through which all the light rays pass is greatly increased, whereby the resistance to and choking or decreasing of the volume of light passing through the lens is decreased very materially. One object of the invention therefore, lies in the placing of any kind of a color screen at a sufficiently greater distance from the lens than is the film, so that this choking effect or decreasing of the volume of light passing therethrough is very much decreased.

It will be understood that when projecting the pictures the corresponding portions of the film must register with proper lines or rulings on the screen, so that the rays passing through the portions of the film acted upon by red rays will pass through the red rulings, and so on, and hence I provide the adjusting screws 11, 12 and 13 so that the screen may be adjusted in all directions, so that it will properly register with the film.

If desired, the camera or projecting apparatus may be given a slight rotating movement relative to the screen to properly register the rulings on the screen with the film.

From the above it will be clear that I do not desire to be limited to the details described, except as clearly pointed out in the appended claims, since many changes, modifications, and other adaptations may well be made by those skilled in the art without departing from the spirit and scope of my invention in its broader aspects.

Having fully and clearly described my invention what I claim as new and desire to secure by Letters Patent, is—

1. Colored moving picture apparatus having in combination a lens, means for moving a moving picture film by the lens, a color screen covered with minute vertical ruling of the primary colors, said screen being at a fixed distance from the lens greater than the distance of the film from the lens, and means for adjusting the screen longitudinally whereby registration of the rulings of the screen with the rays of corresponding colored light may be obtained by adjustment in one direction only.

2. Colored moving picture apparatus having in combination a lens, means for moving a moving picture film by the lens, a color screen covered with minute horizontal ruling of the primary colors, said screen being at a fixed distance from the lens greater than the distance of the film from the lens, and means for adjusting the screen vertically whereby registration of the rulings of the screen with the rays of corresponding colored light may be obtained by adjustment in one direction only.

In testimony whereof I have signed my name to this specification in the presence of two subscribing witnesses.

CLYDE J. COLEMAN.

Witnesses:
GORHAM CROSBY,
EDWIN SEGER.